United States Patent
Ulman et al.

(10) Patent No.: US 9,374,303 B1
(45) Date of Patent: Jun. 21, 2016

(54) METHOD AND APPARATUS FOR PROCESSING MULTICAST PACKETS

(71) Applicant: Marvell Israel (M.I.S.L) Ltd., Yokneam (IL)

(72) Inventors: Sharon Ulman, Kfar Yehoshua (IL); Gil Levy, Hod Hasharon (IL); Rami Zemach, Givat Shapira (IL); Amir Roitshtein, Holon (IL); Shira Turgeman, Nirit (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 71 days.

(21) Appl. No.: 14/514,194

(22) Filed: Oct. 14, 2014

Related U.S. Application Data

(60) Provisional application No. 61/891,219, filed on Oct. 15, 2013.

(51) Int. Cl.
*H04L 12/20* (2006.01)
*H04L 12/741* (2013.01)
*H04L 12/18* (2006.01)

(52) U.S. Cl.
CPC .............. *H04L 45/74* (2013.01); *H04L 12/18* (2013.01)

(58) Field of Classification Search
CPC .................................. H04L 45/74; H04L 12/18
See application file for complete search history.

(56) References Cited

U.S. PATENT DOCUMENTS

| | | | |
|---|---|---|---|
| 7,444,422 B1 * | 10/2008 | Li | H04L 12/18 370/390 |
| 7,924,860 B1 | 4/2011 | Frailong et al. | |
| 2003/0043742 A1 * | 3/2003 | De Maria | H04L 47/10 370/230 |
| 2012/0177047 A1 * | 7/2012 | Roitshtein | H04L 69/22 370/392 |
| 2014/0169378 A1 | 6/2014 | Shumsky et al. | |
| 2014/0192815 A1 | 7/2014 | Shumsky et al. | |
| 2015/0172188 A1 * | 6/2015 | Levy | H04L 45/74 370/392 |

FOREIGN PATENT DOCUMENTS

WO 99/07180 A2 2/1999

OTHER PUBLICATIONS

Shpiner et al., "Reducing the Reordering Delay in Multi-Core Network Processors", Technical Report TR12-01, Com net, Technion, Israel, Jan. 2012, 12 pages.

* cited by examiner

*Primary Examiner* — Robert Wilson

(57) ABSTRACT

Packets received via ports coupled to network links are processed to determine target ports to which the packets are to be forwarded. Appropriate control paths in a network device are selected for processing multicast packets from among a plurality of different control paths having respective processing latencies, the different control paths providing alternative processing paths for processing control information for multicast packets. Multicast packets are further processed using the selected control paths.

20 Claims, 4 Drawing Sheets

METHOD AND APPARATUS FOR PROCESSING MULTICAST PACKETS

CROSS-REFERENCES TO RELATED APPLICATIONS

This disclosure claims the benefit of U.S. Provisional Patent Application No. 61/891,219, entitled "Multicast Flows Using Two Layers Recycle Paths in Sliced Architecture," filed on Oct. 15, 2013, which is hereby incorporated by reference in its entirety.

FIELD OF TECHNOLOGY

The present disclosure relates generally to network devices such as network switches, bridges, routers, etc., and more particularly, to techniques for processing multicast packets in network devices.

BACKGROUND

Network switches, such as bridges and routers, forward packets through a network based on addresses in the packets. A network switch typically includes a plurality of ports coupled to different network links. The network switch may receive a packet via one port and process address information in a header of the packet to decide via which other port or ports the network switch should transmit the packet. The network switch then transmits the packet via the determined one or more other ports. With a multicast packet, the network switch may need to duplicate the packet many times and transmit multiple instances of the multicast packet via multiple ports.

SUMMARY

In an embodiment, a network device comprises a packet processor device configured to process packets received via ports coupled to network links, including processing multicast packets using a plurality of different control paths having respective different processing latencies, the different control paths providing alternative processing paths for processing control information for multicast packets, and determine ports to which received packets are to be forwarded. The network device also comprises a multicast control path selector configured to select appropriate control paths for processing multicast packets, and cause the packet processor to utilize selected control paths when processing multicast packets.

In another embodiment, a method includes processing packets received via ports coupled to network links to determine target ports to which the packets are to be forwarded; selecting appropriate control paths in a network device for processing multicast packets from among a plurality of different control paths having respective processing latencies, the different control paths providing alternative processing paths for processing control information for multicast packets; and further processing multicast packets using the selected control paths.

DETAILED DESCRIPTION

In embodiments disclosed herein in which a network device (e.g., a network switch, router, bridge, etc.) implements multiple different control paths for processing multicast (MC) packets, the network device classifies MC packets and selects appropriate control paths for processing the MC packets based on the classifications. In an embodiment, a control path is a path that control information associated with a packet (e.g., a header of the packet, a descriptor associated with the packet) follows during processing. On the other hand, a data path is a path that a packet payload follows, which typically is of a much larger size than the header, for example.

Processing of an MC packet typically requires generating multiple copies of a header of the MC packet corresponding to multiple instances of the MC packet that are to be transmitted by the network device. In an embodiment, different control paths among the multiple different control paths monopolize processing resources for different amounts of time in order to generate a given amount of MC copies. In an embodiment, a control path that tends to monopolize resource for a relatively longer amount of time typically has a relatively shorter processing latency, and a control path that tends to monopolize resource for a relatively shorter amount of time typically has a relatively longer processing latency. Thus, in an embodiment, different control paths among the multiple different control paths are associated with different respective latencies. In an embodiment, MC packets are classified to reduce the occurrence of MC packets requiring large numbers of copies to be generated thereby monopolizing processing resources of the network device, which may cause other packets to be dropped. For example, in an embodiment, a first MC packet requiring a relatively low number of copies to be generated is classified to be processed by a first control path having a relatively low latency; whereas second MC packet requiring a relatively high number of copies to be generated is classified to be processed by a second control path having a relatively higher latency as compared to the first control path.

Figure 1:
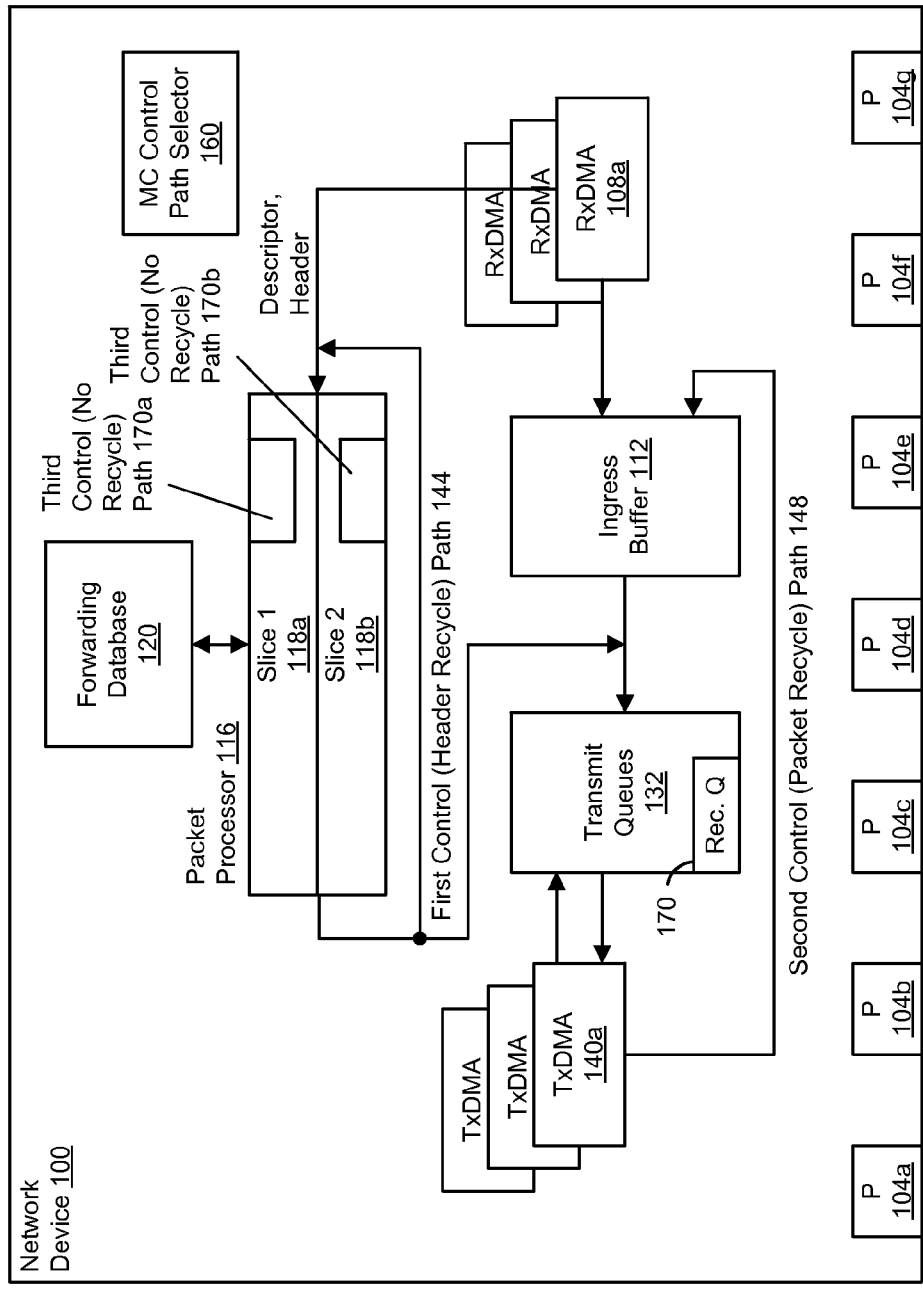
FIG. 1 is a block diagram of an example network device configured to process multicast (MC) packets using multiple control paths, according to an embodiment.

FIG. 1 is a block diagram of an example network device 100, according to an embodiment. The network device 100 includes a plurality of ports 104 communicatively coupled to a plurality of network links (not shown). Although seven ports 104 are illustrated in FIG. 1, the network device 100 includes any suitable number of ports 104 in various embodiments.

One or more receive direct memory access (RxDMA) devices 108 are coupled to the ports 104 (which is not illustrated in FIG. 1 to avoid obscuring the figure). Each RxDMA device 108 is configured to store a packet that was received via one of the ports 104 in an ingress memory device (ingress buffer) 112. In an embodiment, the network device 100 is configured to store packets in the ingress buffer 112 temporarily at least while it is determined via which port or ports 104 the packet is to be transmitted. In some embodiments and/or scenarios, the network device 100 determines that a particular packet is to be dropped or transferred to another memory (not shown) for further processing, and in such circumstances the particular packet is removed from the buffer device 112.

In some embodiments, each RxDMA device 108 is configured to generate a packet descriptor associated with a packet to be processed, in an embodiment. In another embodiment, a suitable descriptor generator separate from the RxDMA devices 108 generates the packet descriptor. The packet descriptor contains information that a packet processor 116 utilizes to process the associated packet. In some embodiments, the packet descriptor includes an address, a pointer, or other suitable indicator of a location in the ingress buffer 112 at which the associated packet is stored. In some embodiments, the RxDMA device 108 determines the location in the ingress buffer 112 at which the associated packet is to be stored. In other embodiments, the indicator of the location in the ingress buffer 112 at which the associated packet is stored is received from the ingress buffer 112 in response to a write request from the RxDMA device 108.

As discussed above, packet descriptors are provided to the packet processor 116. In some embodiments, the RxDMA devices 108 are configured to provide packet headers or portions of packet headers to the packet processor 116 in addition to or instead of packet descriptors. In other embodiments, the RxDMA devices 108 are configured to store packet headers or portions of packet headers in the packet descriptors.

The packet processor 116 is configured to analyze a packet descriptor (and/or in some embodiments header information not included in the descriptor) to determine to which one or more of the ports 104 an associated packet is to be forwarded. In an embodiment, the packet processor 116 is coupled to a forwarding database 120 that stores forwarding information (e.g., port information) associated with addresses (e.g., media access control (MAC) addresses, Internet Protocol (IP) addresses, etc.) and/or other suitable information. In an embodiment, the packet processor 116 is configured to utilize information in the packet descriptor (and/or in some embodiments header information not included in the descriptor) to look up information in the forwarding database 128 that indicates to which one or more ports 104 an associated packet is to be forwarded. In some embodiments, the packet processor 116 is configured to store in the packet descriptor an indication(s) of the determined one or more ports 104.

The packet processor 116 is configured to determine if a packet is a multicast (MC) packet and store an indication that the packet is an MC packet in the associated descriptor, in an embodiment. In an embodiment, the packet processor 116 is configured to analyze information (e.g., address information or other suitable information) in the packet descriptor (and/or in some cases header information not included in the descriptor) to determine if an associated packet is an MC packet.

Additionally, in some embodiments, the packet processor 116 is configured to process a packet descriptor to determine whether and/or how to modify an associated packet (e.g., how to modify a header of an associated packet), in an embodiment. For example, in some scenarios, the packet processor 116 modifies a header of the packet, e.g., to change a next hop address, to add an encapsulating header, to remove an encapsulating header, etc.

In some embodiments, the packet processor 116 comprises a plurality of packet processing cores 118 referred to herein as slices 118. In an embodiment, each slice 118 is a fully functioning packet processor capable of operating in parallel with the other slices 118. Thus, in some embodiments, because multiple slices 118 process packets in parallel, additional slices 118 help to increase the processing throughput of the network device 100. In an embodiment, each slice 118 includes one or more tangible/physical processors configured to perform various packet processing tasks such as those discussed above. In a first illustrative embodiment, each slice 118 includes one or more processors configured to read and execute software and/or firmware instructions stored on a tangible, non-transitory, computer-readable memory (e.g., a random access memory (RAM), a read-only memory (ROM), a FLASH memory, etc.), the processors being configured to execute the instructions to perform packet processing operations. In some embodiments, the software or firmware instructions include computer-readable instructions that, when executed by the processor(s), cause the processor(s) to perform any of the various actions of packet processor 116 described herein. In some embodiments, each slice 118 additionally includes one or more hardware engines that are utilized by the processors to offload certain packet processing tasks.

In another illustrative embodiment, each slice 118 comprises a packet processing pipeline implemented in hardware, such as one or more integrated circuits (ICs), application-specific integrated circuits (ASICs), or any other suitable type(s) of hardware circuit(s). In one such embodiment, various modules of a slice 118 are implemented as respective pipeline stages, respective groupings of pipeline stages, or respective portions of pipeline stages within the slice 118.

In an embodiment, each slice 118 is configured to perform ingress processing of packets. In an embodiment, ingress processing includes initial processing of an ingressing packet and determination of the one or more ports 104 (if any) to which the packet is to be forwarded. In an embodiment, each slice 118 is configured to perform egress processing of packets. In an embodiment, egress processing includes processing of a packet after the determination of the one or more ports 104 (if any) to which the packet is to be forwarded. In some embodiments, egress processing includes modification of a header, egress counting, metering, etc.

Although one forwarding database 120 is illustrated in FIG. 1, in some embodiments, multiple databases 120 are associated with respective slices 118.

Although two slices 118 are illustrated in FIG. 1, different suitable numbers of slices 118 (e.g., three, four, five, six, etc.) are utilized in other embodiments.

In some embodiments, each slice 118 is associated with a respective set of ports 104. For example, in an embodiment, if a packet ingresses via a port 104 in a first set of ports corresponding to the slice 118*a*, the slice 118*a* performs at least ingress processing on the packet; whereas if the packet ingresses via a port 104 in a second set of ports corresponding to the slice 118*b*, the slice 118*b* performs at least ingress processing on the packet. Similarly, in an embodiment, if the packet is to be forwarded to a port 104 in the first set of ports corresponding to the slice 118*a*, the slice 118*a* performs at least egress processing on the packet; whereas if the packet is to be forwarded to a port 104 in the second set of ports corresponding to the slice 118*b*, the slice 118*b* performs at least egress processing on the packet. In other embodiments, each slice 118 is capable of performing ingress processing and/or egress processing for packets received from/forwarded to any of the ports 104.

After it is determined to which port(s) 104 a packet is to be forwarded, the packet is transferred from the ingress buffer 112 to a transmit queue memory 132, at least in some embodiments and/or scenarios. In embodiments in which only a packet payload is stored in the ingress buffer 112, transferring the packet from the ingress buffer 112 to the transmit queue memory 132 comprises merging the associated header (output from the packet processor 116) with the payload from the ingress buffer 112, and storing the merged header and payload in the transmit queue memory 132. In some embodiments, transferring the packet from the ingress buffer 112 to the transmit queue memory 132 also comprises storing the associated descriptor (output from the packet processor 116) in the transmit queue memory 132 in association with the packet.

In some embodiments, the network device 100 is configured to utilize "cut-through" processing for certain packets where payloads of such packets are not transferred to the transmit queue memory 132 but rather are forwarded to ports directly from the ingress buffer 112. For example, in some embodiments, cut-through processing is performed on selected packets after a forwarding decision is made based on header information, but before the entire packet is received at an ingress port.

In an embodiment, the transmit queue memory 132 is organized as a plurality of egress (or transmit) queues, with different egress queues associated with different ones of the ports 104. Thus, in an embodiment, after it is determined that a packet is to be transmitted via a particular port 104, the packet is transferred to an egress queue (in the transmit queue memory 132) corresponding to the particular port 104. As discussed above, however, in some embodiments (e.g., in embodiments utilizing "cut-through" processing for some packets) not all packets are transferred to the transmit queue memory 132.

A plurality of transmit direct memory access (TxDMA) devices 140 are utilized to retrieve packets from transmit queues in the transmit queue memory 132. For example, in an embodiment, when a packet reaches a head of a transmit queue, a TxDMA device 140 reads the packet from the transmit queue memory 132 and provides the packet data (read from the transmit queue memory 132) to a port 104 for transmission. In some embodiments, TxDMA devices 140 are configured to read packet data for packets selected for cut-through processing from the ingress buffer 112 and provide such packet data (read from the ingress buffer 112) to ports 104 for transmission.

In an embodiment, each TxDMA device 140 is configured to utilize a location indicator in a packet descriptor to read data corresponding to the associated packet from the transmit queue memory 132 (or sometimes in the ingress buffer 112). The TxDMA device 140 then provides the packet data (read from the transmit queue memory 132 or from the ingress buffer 112) to a port 104, indicated by the associated packet descriptor, for transmission from the port 104, according to an embodiment.

For a unicast packet, the packet is typically read once from the transmit queue memory 132 (or sometimes in the ingress buffer 112) and transmitted from the appropriate port 104, in an embodiment. An MC packet, however, is often transmitted multiple times from multiple ports 104 as multiple instances of the packet, and in some cases transmitted tens or even hundreds of times via multiple ports 104.

The network device 100 is configured to provide a plurality of different control paths for generating multiple instances a packet for MC forwarding, according to an embodiment. The plurality of different control paths have different associated latencies, in some embodiments. For example, the network device includes a first control path 144 and a second control path 148, in an embodiment. The first control path 144 is associated with a header recycle technique for generating multiple instances of an MC packet, according to an embodiment, as will be described in more detail below. The second control path 148 is associated with a packet recycle technique for generating multiple instances of an MC packet, according to an embodiment, as will be described in more detail below. The first control path 144 provides relatively lower latency (as compared with the second control path 148) but requires MC packet data to remain in the ingress buffer 112 for a relatively longer time (as compared with the second control path 148); the second control path 148 provides relatively higher latency (as compared with the first control path 144) but requires MC packet data to remain in the ingress buffer 112 for a relatively shorter time (as compared with the first control path 144), according to an embodiment.

In some embodiments, the network device 100 is configured to provide a third control (no recycle) path 170 for generating multiple instances a packet for MC forwarding, according to an embodiment. In an embodiment, the third control path 170 corresponds to generating multiple instances of a packet without utilizing header recycle processing or packet recycle processing, as will be described in more detail below.

An MC control path selector 160 is configured to select a control path from the plurality of control paths for generating multiple instances of an MC packet. In an embodiment, the MC control path selector 160 is configured to select a control path for processing an MC packet based on a number of instances of the MC packet to be generated. For example, when a relatively large number of instances of the MC packet is to be generated (a high duplication MC packet), it will take the network device 100 relatively more time to generate all of the instances as compared to another MC packet with many fewer instances to be generated (a low duplication MC packet). If packet data corresponding to the high duplication MC packet were to remain in the ingress buffer 112 continuously until all instances were generated, this would, in some scenarios, i) cause the ingress buffer 112 to become full as further packets ingress the network device 100, and thus, ii) cause the network device 100 to drop further ingressing packets, at least in some embodiments. Thus, the MC control path selector 160 selects, for a high duplication MC packet, a control path (e.g., the control path 148) that reduces the amount of time that packet data corresponding to the MC packet continuously stays in the ingress buffer 112, according to an embodiment. On the other hand, if packet data corresponding to a low duplication MC packet were to remain in the ingress buffer 112 continuously until all MC instances were generated, this would not cause the problems discussed above, at least in most scenarios. Thus, the MC control path selector 160 selects, for a low duplication MC packet, a control path (e.g., the control path 144) where packet data corresponding to the MC packet continuously stays in the ingress buffer 112 until all instances of the MC packet are generated, according to an embodiment.

In some embodiments, the MC control path selector 160 is configured to utilize, additionally or alternatively, one or more other suitable criteria for selecting a control path from the plurality of control paths for generating multiple instances of an MC packet. For example, in an embodiment, the MC control path selector 160 is configured to select a control path based on whether multiple instances of the MC packet require different egress processing (e.g., different header modification, different egress counting, different metering, etc.). In the present application, an MC packet in which all instances require the same egress processing is referred to as a "same flow"; an MC packet in which all instances require different egress processing is referred to as a "different flow"; and an MC packet in which some instances require the same egress processing and other instances require different egress processing is referred to as a "hybrid flow".

In an embodiment, the MC control path selector 160 is configured classify MC packets and to select control paths based on the classification. As an illustrative embodiment, the MC control path selector 160 is configured classify MC packets into six types as set forth in Table 1.

TABLE 1

| Type | Same/Different Flow | High Duplication? |
|---|---|---|
| Type 1 | Same | No |
| Type 2 | Different | No |
| Type 3 | Hybrid | No |
| Type 4 | Same | Yes |
| Type 5 | Different | Yes |
| Type 6 | Hybrid | Yes |

In other embodiments, the MC control path selector 160 is configured classify MC packets into a different suitable number of categories (other than six) and/or based on (additionally or alternatively) other suitable criteria.

For ease of explanation, the control path 144 (header recycle) will now be described in the context of an embodiment in which each slice 118 is associated with a respective set of ports; however, a header recycle control path is utilized in other contexts as well, according to other embodiments.

When an ingressing MC packet is received via a port 104 in a first set of ports associated with slice 118a, at least a payload of the packet is stored in the ingress buffer 112. Additionally, the slice 118a performs ingress processing on a descriptor associated with the packet and/or a header of the packet. For example, such ingress processing includes determining one or more target ports 104 to which the packet is to be forwarded, in an embodiment. For instances of the MC packet that are to be forwarded to target ports 104 in the first set of ports 104 associated with the slice 118a, the slice 118a performs egress processing corresponding to those instances, such as MC header duplication, header modification (if appropriate), egress counting, metering, etc.

When the MC control path selector 160 selects the control path 144 (header recycle) for processing the packet, the slice 118a forwards the corresponding header and/or corresponding descriptor to the slice 118b to perform processing for instances of the MC packet that are to be forwarded to target ports 104 in a second set of ports 104 associated with the slice 118b. In response, the slice 118b performs egress processing corresponding to those instances, such as MC header duplication, header modification (if appropriate), egress counting, metering, etc. Thus, when the control path 144 is utilized, egress processing of the MC packet instances is shared between multiple slices 118, in an embodiment, as opposed to burdening a single slice 118 with all egress processing of all instances of the MC packet.

In an embodiment, when the control path 144 is utilized, packet data corresponding to the MC packet in the ingress buffer 112 continuously remains in the ingress buffer 112 until copies of the packet data corresponding to all of the instances have been transferred to the transmit queues 132. As discussed above, if the packet data continuously remains in the ingress buffer 112 for too long, the ingress buffer 112 may fill up and cause further ingressing packets to be dropped. Thus, in an embodiment, the MC control path selector 160 selects the control path 144 in scenarios when it is expected that the associated packet data will not continuously remain in the ingress buffer 112 for a period of time that will cause such problems.

For ease of explanation, the control path 148 (header recycle) will now be described in the context of an embodiment in which each slice 118 is associated with a respective set of ports; however, a header recycle control path is utilized in other contexts as well, according to other embodiments.

When an ingressing MC packet is received via a port 104 in the first set of ports associated with slice 118a, at least a payload of the packet is stored in the ingress buffer 112. Additionally, the slice 118a performs ingress processing on a descriptor associated with the packet and/or a header of the packet. For example, such ingress processing includes determining one or more target ports 104 to which the packet is to be forwarded, in an embodiment. In a first pass, the slice 118a performs egress processing for a first instance of packet and the corresponding packet data in the ingress buffer 112 is copied to a first egress queue, corresponding to a first target port 104, in the transmit queues 132. Scheduling, shaping, etc., are performed and the first instance of the packet is eventually retrieved from the first queue and transmitted via the first target port 104.

Additionally, the slice 118a generates a copy of the header. In an embodiment, the copy of the header is merged with the corresponding packet data from the ingress buffer 112, and the merged header/payload is stored to a recycle queue 170 in the transmit queues 132, and the memory space in the ingress buffer 112 in which the corresponding packet data was stored is deallocated or otherwise made available for storing further ingressing packets. In some embodiments, scheduling, shaping, etc., are performed in connection with the recycle queue 170.

The packet data corresponding to the MC packet in the recycle is eventually retrieved from the recycle queue 170 (e.g., by a TxDMA 140) and provided as an input to the ingress buffer 112. Thus, in a second pass, the packet data corresponding to the MC packet is re-stored in the ingress buffer 112. Additionally in the second pass, one of the slices 118 performs egress processing for a second instance of the packet, and the corresponding packet data in the ingress buffer 112 is copied to a second egress queue, corresponding to a second target port 104, in the transmit queues 132. Scheduling, shaping, etc., are performed and the second instance of the packet is eventually retrieved from the first queue and transmitted via the first target port 104.

Additionally, when one or more additional instances of the packet are to be generated, the slice 118 generates a copy of the header. In an embodiment, the copy of the header is merged with the corresponding packet data from the ingress buffer 112, and the merged header/payload is stored in the recycle queue 170 in the transmit queues 132. The memory space in the ingress buffer 112 in which the corresponding packet data was stored is deallocated or otherwise made available for storing further ingressing packets.

When one or more additional instances of the packet are to be generated, the above described packet recycle processing is repeated for one or more further passes (e.g., a third pass, a fourth pass, etc.).

Thus, in an embodiment, when the control path 148 is utilized, packet data corresponding to the MC packet in the ingress buffer 112 does not continuously remain in the ingress buffer 112 until copies of the packet data corresponding to all of the instances have been transferred to the transmit queues 132. Rather, as discussed above, the packet data is transferred to the recycle queue 170 and eventually re-stored in the ingress buffer 112. Thus, in an embodiment, the MC control path selector 160 selects the control path 148 in scenarios when the control path 144 should not be selected such as for reasons discussed above.

In some embodiments, the plurality of control paths includes a third control path 170 (no recycle path). For example, in an embodiment, each slice 118 includes a respective third control path 170. In an embodiment, the control path 170 involves the slice 118 generating of all instances of an MC packet in response to a first arrival of the header of an ingressing packet (e.g., neither the control path 144 (header recycle) nor the control path 148 (packet recycle) is utilized).

Referring to Table 1, in an embodiment, the control path 170 (no recycle) is suitable for use, at least in some scenarios, with Type 1, Type 2, and Type 3 packets; the control path 144 (header recycle) is suitable for use, at least in some scenarios, with Type 2 and Type 3 packets; and the control path 148 (packet recycle) is suitable for use, at least in some scenarios, with Type 4, Type 5, and Type 6 packets. Thus, in an embodiment, the MC control path selector 160 is configured to select the control path 170 for Type 1 packets; the MC control path selector 160 is configured to select the control path 170 and/or the control path 144 for Type 2 and Type 3 packets; and the MC control path selector 160 is configured to select the control path 148 for Type 4, Type 5, and Type 6 packets. In some embodiments, multiple control paths are utilized for a single MC packet. For example, in an embodiment, for packet of Type 2 and Type 3, a slice 118 utilizes control path 170 for packet instances that are to be forwarded to a set of ports 104 associated with the slice 118, whereas the control path 144 is utilized for packet instances that are to be forwarded to one or more other sets of ports 104 associated with one or more other slices 118.

Figure 2:
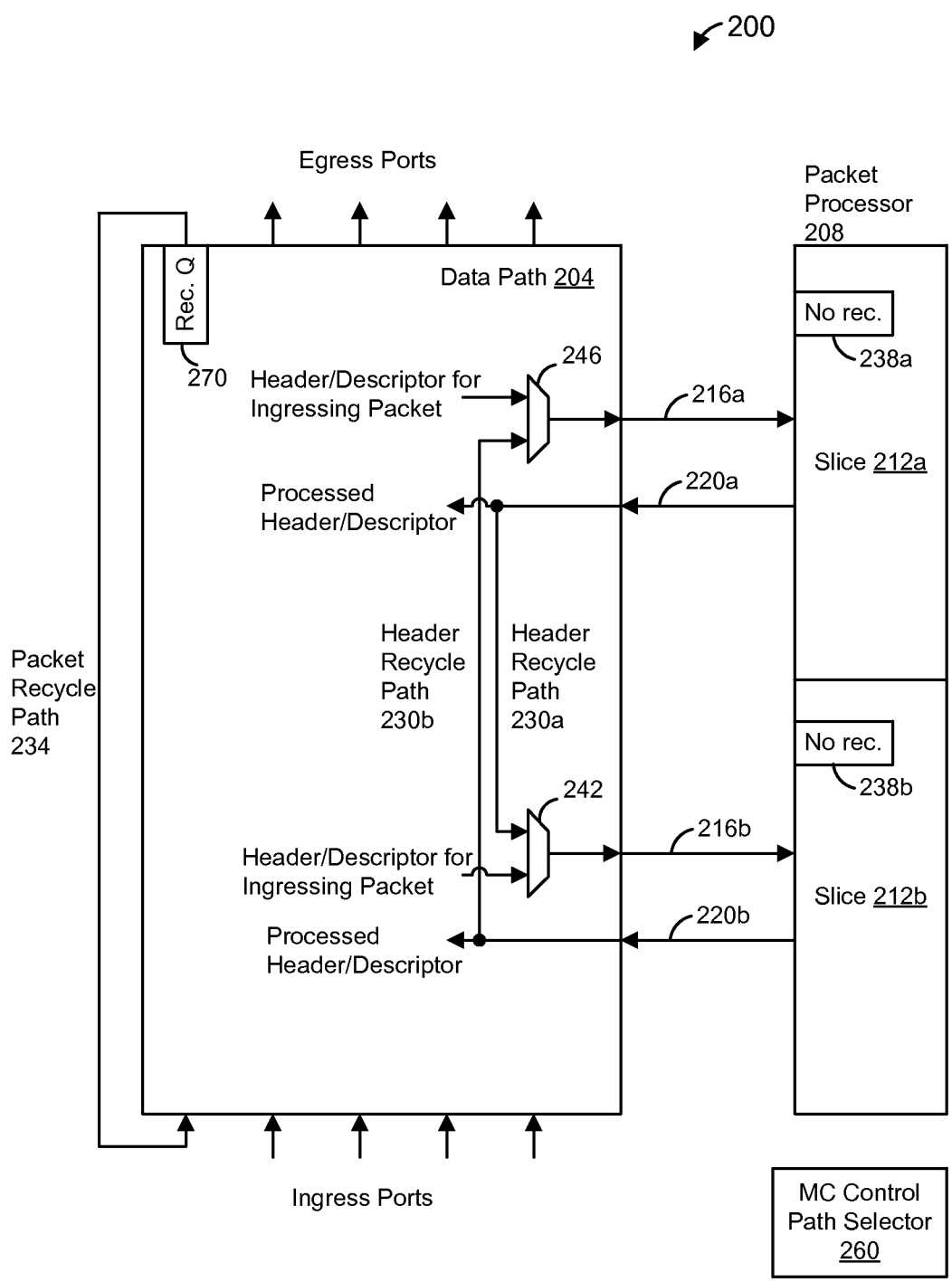
FIG. 2 is a block diagram of another example network device configured to process MC packets using multiple control paths, according to another embodiment.

FIG. 2 is a block diagram of another example network device 200, according to an embodiment. In an embodiment, FIG. 2 is merely a different conceptual view of the network device 100 of FIG. 1, and FIG. 2 is described with reference to FIG. 1 for ease of explanation. In other embodiments, however, the network device 200 is a suitable device different than the network device 100 of FIG. 1.

The network device 200 comprises a data path 204 coupled to a packet processor 208. The data path 204 is coupled to a plurality of ports and includes one or more memories (not shown) for storing packets that have ingressed via ports of the network device 200. For example, in an embodiment, the data path 204 includes the ingress buffer 112 and the transmit queues 132 arranged as shown in FIG. 1.

The data path 204 is configured to provide packet descriptors and/or headers associated with ingressing packets to a packet processor 208. In an embodiment, the packet processor 208 is the packet processor 116 of FIG. 1, and comprises a plurality of slices 212 (e.g., the same as or similar to slices 118 of FIG. 1). In other embodiments, however, the packet processor 208 is a suitable packet processor different than the packet processor 116 of FIG. 1. In another embodiment, the packet processor 208 does not comprise multiple slices 212, but rather comprises a single packet processing core.

In an embodiment, the data path 204 is coupled to the packet processor 208 via one or more first descriptor/header exchange links 216. For example, in an embodiment, a respective first descriptor/header exchange link 216 couples the data path 204 to each slice 212. The data path 204 is configured to send packet descriptors and/or headers associated with ingressing packets to the packet processor 208 via the first descriptor/header exchange links 216.

Similarly, in an embodiment, the data path 204 is also coupled to the packet processor 208 via one or more second descriptor/header exchange links 220. For example, in an embodiment, a respective second descriptor/header exchange link 220 couples the data path 204 to each slice 212. The packet processor 208 is configured to send packet descriptors and/or headers that have been processed by the packet processor 208 to the data path 204 via the descriptor/header exchange links 220.

When an ingressing packet is received by the data path 204, the data path 204 saves the packet to a memory of the data path 204. Additionally, in an embodiment, the data path 204 generates a descriptor and sends the descriptor and/or a header of the packet to the packet processor 208 via one of the first descriptor/header exchange links 216. The packet processor 208 performs packet processing operations (such as described above in connection with FIG. 1) on the descriptor and/or the header and then forwards the processed descriptor and/or header to the data path 204 via one of the second descriptor/header exchange links 220.

For MC packets, the network device 200 utilizes multiple control paths in the same manner in which the network device 100 utilizes multiple control paths, according to an embodiment. For example, in an embodiment, the network device 200 includes header recycle paths 230 and a packet recycle path 234. In another embodiment, the network device 200 also includes control paths 238 (no recycle paths 238) that do not utilize header recycling or packet recycling. In an embodiment, an MC control path selector 260 selects, for each MC packet, a control path from the multiple control paths to be utilized in processing the MC packet.

For example, when an MC packet is initially processed by the slice 212a and the MC control path selector 260 selects the header recycle path 230a, the slice 212a performs ingress processing on the associated packet descriptor and/or header and forwards the processed packet descriptor and/or header to the slice 212b via the link 220a, the header recycle path 230a, a multiplexer 242, and the link 216b. Then, the slice 212b performs egress processing on the associated packet descriptor and/or header. Similarly, when the MC packet is initially processed by the slice 212b and the MC control path selector 260 selects the header recycle path 230b, the slice 212b performs ingress processing on the associated packet descriptor and/or header and forwards the processed packet descriptor and/or header to the slice 212b via the link 220b, the header recycle path 230b, a multiplexer 246, and the link 216a.

In an embodiment, priority is given to recycled descriptors/headers as compared to descriptors/headers corresponding to ingressing packets that have not yet been processed. For example, in an embodiment, the multiplexers 242 and 246 are utilized to provide priority to descriptors/headers received via the header recycle paths 230 over descriptors/headers corresponding to ingressing packets that have not yet been processed.

In an embodiment, when an MC packet is initially processed by the slice 212a in a first pass and the MC control path selector 260 selects the packet recycle path 234, the slice 212a performs ingress processing on the associated packet descriptor and/or header and forwards the processed packet descriptor and/or header to the data path 204 via the link 220a. In response, the data path 204 copies associated packet data to a recycle queue 270. Eventually, an instance of the MC packet is then recycled back to an input of the data path 204 for processing in a second pass. In the second pass, the packet processor 208 performs egress processing on the descriptor/header. If more instances of the MC packet are to be generated, the MC packet is again recycled and processed in a similar manner in one or more further passes.

Similarly, when an MC packet is initially processed by the slice 212b in a first pass and the MC control path selector 260 selects the packet recycle path 234, the slice 212b performs ingress processing on the associated packet descriptor and/or header and forwards the processed packet descriptor and/or header to the data path 204 via the link 220b. In response, the data path 204 copies associated packet data to the recycle queue 270. Eventually, an instance of the MC packet is then recycled back to the input of the data path 204 for processing in a second pass. In the second pass, the packet processor 208 performs egress processing on the descriptor/header. If more instances of the MC packet are to be generated, the MC packet is recycled and processed in a similar manner in one or more further passes.

In embodiments having the no recycle paths 238, when an MC packet is initially processed by the slice 212a and the MC control path selector 260 selects the no recycle path 238a, the slice 212a performs ingress processing on the associated packet descriptor and/or header, generates multiple instances of the packet descriptor and/or header, performs egress processing on the multiple instances, and forwards the multiple packet descriptors and/or headers to the data path 204 via the link 220a. Similarly, when the MC packet is initially processed by the slice 212b and the MC control path selector 260 selects the no recycle path 238b, the slice 212b performs ingress processing on the associated packet descriptor and/or header, generates multiple instances of the packet descriptor and/or header, performs egress processing on the multiple instances, and forwards the multiple packet descriptors and/or headers to the data path 204 via the link 220b.

Figure 3:
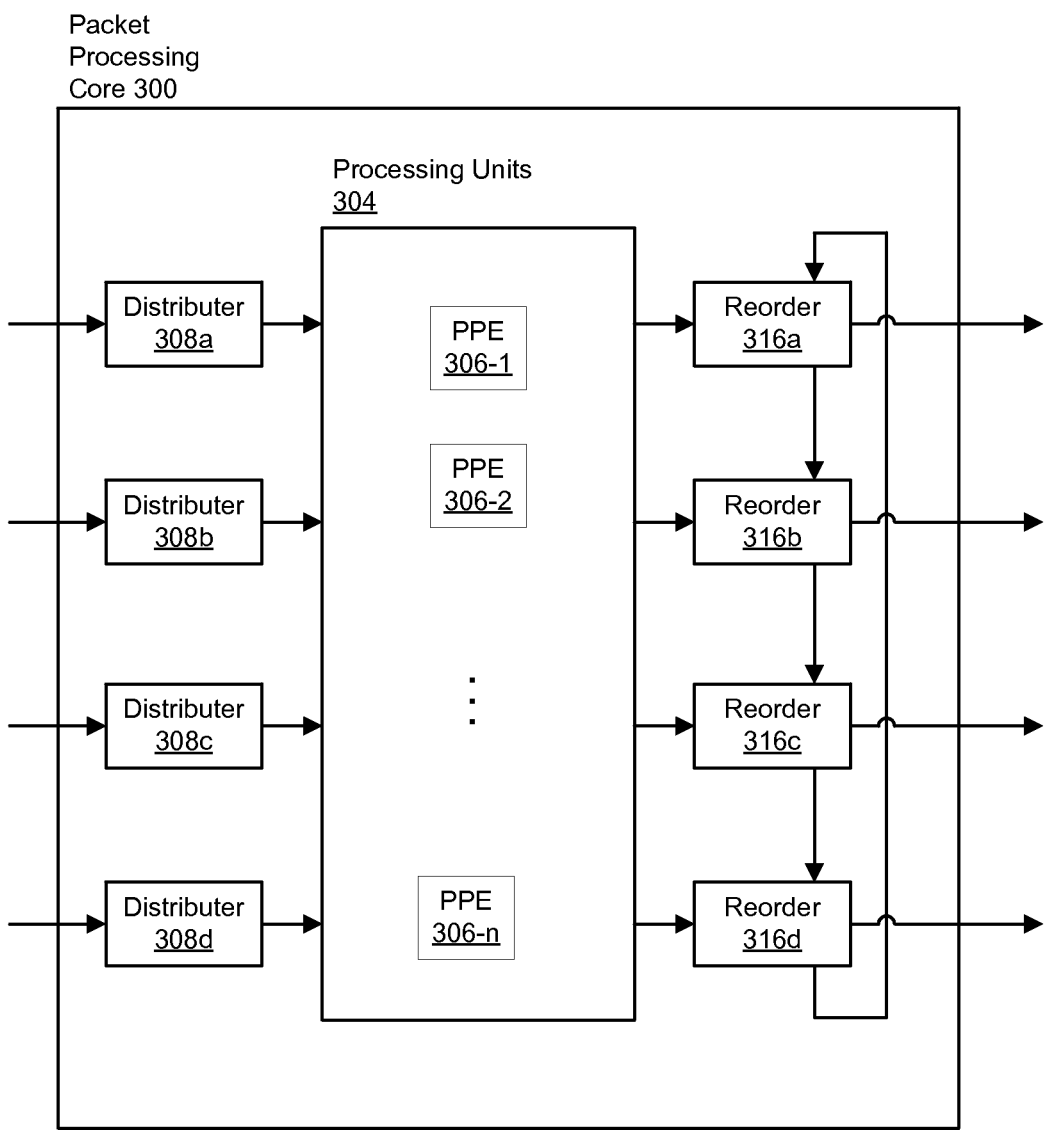
FIG. 3 is a block diagram of an example packet processing core configured to process MC packets, according to another embodiment.

FIG. 3 is a block diagram on an example packet processing core 300 configured to implement a control path (no recycle path) that does not utilize a header cycle path or a packet recycle path as described above, according to an embodiment. In an embodiment, the packet processing core 300 is utilized as the packet processor 116 in FIG. 1. In another embodiment, each slice 118 in FIG. 1 is implemented as a respective packet processing core 300. In an embodiment, the packet processing core 300 is utilized as the packet processor 208 in FIG. 2. In another embodiment, each slice 212 in FIG. 2 is implemented as a respective packet processing core 300. In other embodiments, the packet processor 116 in FIG. 1 and/or the packet processor 208 in FIG. 2 utilize another suitable packet processing core different than the core 300.

The core 300 includes a plurality of packet processing units 304 including a plurality of packet processing elements (PPEs) 306. The core 300 also includes one or more distributers 308. The one or more distributers 308 are configured to distribute processing of descriptors/headers to the plurality of PPEs 306. The PPEs 306 are configured to concurrently, in parallel, perform processing of respective packets, and each PPE 306 is generally configured to perform at least two different processing operations on the packets, in an embodiment. According to an embodiment, the PPEs 306 are configured to process packets by executing computer readable instructions stored in a non-transitory memory (not shown), and each PPE 306 is configured to perform all necessary processing (run to completion processing) of a descriptor/header. In other embodiments, at least some PPEs 306 are configured to perform only subsets of necessary processing of descriptors/headers. In some embodiments, at least some PPEs 306 are configured to utilize hardware engines (not shown) to perform portions of necessary processing of descriptors/headers.

Typically, order of data packets in a data flow needs to be maintained through a network device such that the order in which the packets are transmitted from the network device is the same as the order in which the packets were received by the network device 100. However, because processing of packets in a data flow is distributed among multiple ones of the PPEs 306, processing of the packets in the data flow is completed by the PPEs 306 in an order different than the order in which the packets were received by the network device, in at least some situations. Out of order completion of processing of the packets is due, for example, to variance in latency encountered by different PPEs 306 when accessing an external resource, such as external memory, an external hardware engine, etc. for performing a processing operation on a packet.

In an embodiment, one or more reordering units 316 are configured to maintain order of at least the packets belonging to a same data flow entering the network device to ensure that these packets are transmitted from the network device in the order in which the packets were received by the network device.

Each reordering unit 316 is configured to process unicast packets as well as multicast packets, in an embodiment. In an embodiment, when multiple data streams corresponding to a multicast data flow are to be transmitted by the network device, different ones of the reordering units 316 maintain order of packets within the different data streams transmitted by the network device. Distributing multiple data streams among multiple reordering units 316 allows the multiple data streams to be transmitted from a network device that utilizes the processing core 300 at a higher rate compared to systems in which a single ordering unit is used to maintain order for all data streams corresponding to a multicast data flow, in at least some embodiments.

According to an embodiment, when a descriptor/header of a first instance of a multicast packet is forwarded by a first reordering unit 316 to the data path (e.g., data path 204) of the network device for transmission of the first instance via a first port, a descriptor/header of a second instance of the packet is enqueued in a second reordering unit 316 and is subsequently forwarded by the second reordering unit 316 to the data path (e.g., data path 204) for transmission of the second instance of the packet via a second port. In an embodiment, the reordering units 316 are arranged in a circular chain of reordering units 316, with each reordering unit 316 configured to receive descriptors/headers from the preceding reordering unit 316 in the chain of reordering units 316, and to relay descriptors/headers to the following reordering unit 316 in the chain of reordering units 316. In operation, when an reordering unit 316 forwards a descriptor/header of an instance of a multicast packet to the data path, the reordering unit 316 checks whether an additional instance of the packet is still to be transmitted by the network device. For example, the reordering unit 316 receives an instruction from a PPE 306 indicating that processing of the packet has been completed by the PPE 306, in an embodiment. In an embodiment, the instruction also includes an indication of whether or not the current instance of the packet (e.g., corresponding to the header/descriptor that is queued in the reordering unit 316) is the last instance of the packet to be transmitted by the network device. If an additional instance of the packet is still to be transmitted by the network device, for example if the instruction indicates that the current instance of the packet A is not the last instance of the packet to be transmitted by the network device, then the reordering unit 316 relays the descriptor/header to the following reordering unit 316 in the chain of reordering units 316, and the descriptor/header is enqueued in the following reordering unit 316 for subsequent forwarding to the data path, and so on, until no more instances of the multicast packet remain to be transmitted by the network device. As a result, a particular reordering unit 316 in the chain of reordering units 316 maintains order of instances of multicast packets in a particular data stream of the multicast packets transmitted by the network device, in this embodiment.

In some embodiments, the above-discussed operation of the chain of reordering units 316 is utilized to implement the control path 170 of FIG. 1 and/or the control path 238 of FIG. 2.

Figure 4:
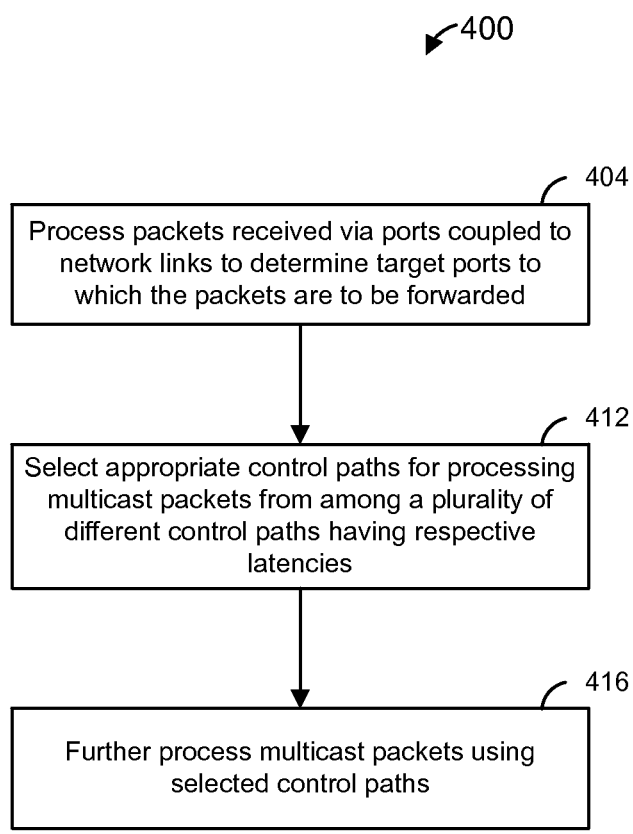
FIG. 4 is a flow diagram of an example method for processing MC packets, according to an embodiment.

FIG. 4 is a flow diagram of an example method 400 for processing MC packets, according to an embodiment. In an embodiment, the network device 100 of FIG. 1 implements the method 400. In some embodiments, the method 400 is implemented by the network device 200. In some embodiments, the method 400 is implemented in conjunction with the packet processing core 300 of FIG. 3. The method 400 is discussed with reference to FIG. 1 merely for explanatory purposes. In other embodiments, the method 400 is implemented by a suitable network device different than the network device 100 (FIG. 1) and/or the network device 200 (FIG. 2), and/or in conjunction with another suitable packet processing core different than the packet processing core 300 (FIG. 3).

At block 404, packets received via ports of a network device are processed to determine one or more target ports to which the packets are to be forwarded. For example, in an embodiment, the packet processor 116 performs ingress processing on received packets to determine one or more target ports to which the packets are to be forwarded. As another example, in an embodiment, the packet processor 208 performs ingress processing on received packets to determine one or more target ports to which the packets are to be forwarded.

At block 412, appropriate control paths for processing MC packets are selected from among a plurality of different control paths. In an embodiment, different control paths are associated with different latencies. For example, for a given number of MC packet instances to be generated, the control path 148 (FIG. 1) has a longer latency than that of the control path 144 (FIG. 1). Similarly, for a given number of MC packet instances to be generated, the control path 144 (FIG. 1) has a longer latency than that of the control path 170 (FIG. 1).

In an embodiment, different control paths are associated with different amounts of time that packet data corresponding to an MC packet must continuously remain in an ingress buffer. For example, referring to FIG. 1, for a given number of MC packet instances to be generated, packet data must continuously remain in the ingress buffer 112 for a shorter amount of time when using the control path 148 as compared to using the control path 144 or the control path 170.

In an embodiment, a control path is selected at block 412 based on how many instances of the MC packet are to be generated. For example, in an embodiment, a first time estimate is generated, the first time estimate being an estimate of an amount of time packet data of an MC packet would need to continuously remain in the ingress buffer 112 if all packet instances were generated using a first control path. The first time estimate is then utilized to determine whether to utilize the first control path, in an embodiment. For example, the first time estimate is compared to a threshold, and if the first time estimate meets the threshold then the first control path is not selected, according to an embodiment. In an embodiment, the threshold corresponds to a maximum amount of time packet data can continuously remain in the ingress buffer without causing problems such as buffer overflow. Similarly, in an embodiment, a second time estimate is generated, the second time estimate being an estimate of an amount of time packet data of an MC packet would need to continuously remain in the ingress buffer 112 if all packet instances were generated using a second control path. The second time estimate is then utilized to determine whether to utilize the second control path, in an embodiment. For example, the second time estimate is compared to the threshold, and if the second time estimate meets the threshold then the second control path is not selected, according to an embodiment.

In an embodiment, a time estimate for an amount of time packet data of an MC packet would need to continuously remain in the ingress buffer 112 if all packet instances were generated using a control path 144 (header recycle) is determined according to:

$$\text{Time Estimate} = \text{ingress processing time} + \text{header recycle time} + \text{MAX}(\text{number of copies}(i) * \text{egress processing time}(i)) \quad \text{(Equ. 1)}$$

where ingress processing time is an estimate of an amount of time to perform ingress processing on the MC packet;

header recycle time is an estimate of an amount of time to transfer a descriptor/header from one slice to another slice;

number of copies(i) is the number of copies of the header to be generated by an i-th slice; and egress processing time(i) is an estimate of an amount of time to perform egress processing on each copy at the i-th slice.

In some embodiments, block 412 includes classifying packets and selecting control paths based on the classifications. As merely an illustrative example, packets are classified into multiple types as set forth in Table 1, according to an embodiment. In other embodiments, MC packets are classified into a different suitable number of categories (other than six) and/or based on (additionally or alternatively) other suitable criteria.

In some embodiments, an MC packet is determined to satisfy the "high duplication" criteria (discussed above with reference to Table 1) based on determining a time estimate of an amount of time packet data of an MC packet would need to continuously remain in the ingress buffer 112 if all packet instances were generated using a first control path, and comparing the time estimate to a threshold (such as described above).

Referring to Table 1, in an embodiment, the control path 170 (no recycle) is selected, at least in some scenarios, with Type 1, Type 2, and Type 3 packets when all instances are to be forwarded to ports associated with a single slice. In an embodiment, the control path 144 (header recycle) is selected for Type 2 and Type 3 packets and when instances are to be forwarded to ports associated with multiple slices. In an embodiment, the control path 148 (packet recycle) is selected for Type 4, Type 5, and Type 6 packets. In some embodiments, multiple control paths are selected for a single MC packet. For example, in an embodiment, for packets of Type 2 and Type 3, a first slice 118 utilizes control path 170 for packet instances that are to be forwarded to a set of ports 104 associated with the slice 118, whereas the control path 144 is utilized to forward a descriptor/header to another slice 118 for egress processing of packet instances that are to be forwarded to one or more other sets of ports 104 associated with the other slice 118.

At block 416, multicast packets are further processed using the control paths selected at block 412. For example, for initially processed descriptors/headers transferred using control path 144 or 148, egress processing is performed, in an embodiment. Similarly, in an embodiment, some initially processed descriptors/headers are further processed using control path 170.

At least some of the various blocks, operations, and techniques described above may be implemented utilizing hardware, a processor executing firmware instructions, a processor executing software instructions, or any combination thereof.

When implemented in hardware, the hardware may comprise one or more of discrete components, an integrated circuit, an application-specific integrated circuit (ASIC), a programmable logic device (PLD), etc.

When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

While the present invention has been described with reference to specific examples, which are intended to be illustrative only and not to be limiting of the invention, changes, additions and/or deletions may be made to the disclosed embodiments without departing from the scope of the invention. For example, one or more portions of methods or techniques described above may be performed in a different order (or concurrently) and still achieve desirable results.

What is claimed is:

1. A network device, comprising:
    a packet processor device configured to
        process packets received via ports coupled to network links, including processing multicast packets using a plurality of different control paths having respective different processing latencies, the different control paths providing alternative processing paths for processing control information for multicast packets, and
        determine ports to which received packets are to be forwarded; and
    a multicast control path selector configured to
        select appropriate control paths for processing multicast packets, and
        cause the packet processor to utilize selected control paths when processing multicast packets.

2. The network device of claim 1, wherein the plurality of different control paths includes:
    a first control path in which a header of a first multicast packet is reprocessed by the packet processor in multiple passes while a payload of the first multicast packet remains stored in a memory of the packet processor device, including re-processing the header of the first multicast packet in the first control path; and
    a second control path in which a header of a second multicast packet is reprocessed by the packet processor in multiple passes, including re-processing the header of the second multicast packet in the second control path and re-storing the second multicast packet in the memory multiple times.

3. The network device of claim 2, wherein the plurality of different control paths further includes:
    a third control path in which multiple instances of a header of a third multicast packet are processed by the packet processor in a single pass, wherein the multiple instances of the header of the third multicast packet correspond to multiple instances of the third multicast packet to be transmitted.

4. The network device of claim 2, further comprising:
    a data path having an egress queue in which to store packet payload data corresponding to multicast packets that are to be reprocessed by the packet processor in multiple passes according to the second control path, the egress queue having an output coupled to an ingress portion of the data path.

5. The network device of claim 2, wherein:
    the packet processor device includes multiple processing cores configured to process packet headers in parallel; and
    wherein the packet processor device is configured to reprocess the headers of the first multicast packet according to the first control path such that different instances of the headers of the first multicast packet are processed with different ones of the multiple processing cores.

6. The network device of claim 1, wherein the multicast control path selector is configured to:
    classify multicast packets into different multicast flow types associated with different numbers of packet copies to be generated, and
    select appropriate control paths for processing multicast packets based on the classifications.

7. The network device of claim 6, wherein the multicast control path selector is configured to:
    classify multicast packets into the different multicast flow types based on time estimates corresponding to processing times needed to process instances of the multicast packets.

8. The network device of claim 7, wherein the multicast control path selector is configured to:
    classify multicast packets into the different multicast flow types based on time estimates corresponding to processing times needed to process instances of the multicast packets assuming utilization of one of the control paths.

9. The network device of claim 1, wherein the multicast control path selector is configured to:
    generate estimates of processing times needed to process instances of the multicast packets; and
    select the appropriate control paths based on the generated estimates.

10. The network device of claim 9, wherein the multicast control path selector is configured to:
    generate the estimates of processing times needed to process instances of the multicast packets assuming utilization of one of the control paths.

11. A method, comprising:
    processing packets received via ports coupled to network links to determine target ports to which the packets are to be forwarded;
    selecting appropriate control paths in a network device for processing multicast packets from among a plurality of different control paths having respective processing latencies, the different control paths providing alternative processing paths for processing control information for multicast packets; and
    further processing multicast packets using the selected control paths.

12. The method of claim 11, wherein selecting appropriate control paths for processing multicast packets includes:
    selecting a first control path for processing a first multicast packet such that the first multicast packet is reprocessed by the packet processor in multiple passes while a payload of the first multicast packet remains stored in a memory of the packet processor device, including re-processing the header of the first multicast packet in the first control path; and
    selecting a second control path for processing a second multicast packet such that the second multicast packet is reprocessed by the packet processor in multiple passes, including re-processing the header of the second multicast packet in the second control path and re-storing the second multicast packet in the memory multiple times.

13. The method of claim 12, wherein selecting appropriate control paths for processing multicast packets further includes:

selecting a third control path for processing a third multicast packet such that the third multicast packet is processed by the packet processor in a single pass, wherein the multiple instances of the header of the third multicast packet correspond to multiple instances of the third multicast packet to be transmitted.

14. The method of claim 12, further comprising:

storing in an egress queue packet payload data corresponding to multicast packets that are to be reprocessed by the packet processor in multiple passes according to the second control path.

15. The method of claim 12, further comprising:

reprocessing the headers of the first multicast packet according to the first control path such that different instances of the headers of the first multicast packet are processed with different ones of multiple packet processing cores.

16. The method of claim 11, further comprising:

classifying multicast packets into different multicast flow types associated with different numbers of packet copies to be generated;

wherein selecting appropriate control paths for processing multicast packets is based on the classifications.

17. The method of claim 16, wherein classifying multicast packets comprises:

generating time estimates corresponding to processing times needed to process instances of the multicast packets; and classifying multicast packets into the different multicast flow types based on the time estimates.

18. The method of claim 16, wherein generating the time estimates assumes utilization of one of the control paths to process instances of the multicast packets.

19. The method of claim 11, further comprising:

generating estimates of processing times needed to process instances of the multicast packets;

wherein selecting the appropriate control paths is based on the generated estimates.

20. The method of claim 19, wherein generating the estimates assumes utilization of one of the control paths too process instances of the multicast packets.

\* \* \* \* \*